April 10, 1962
A. H. FRISCH
3,028,686
DEVICE FOR ILLUSTRATING VECTORS
Filed July 6, 1961
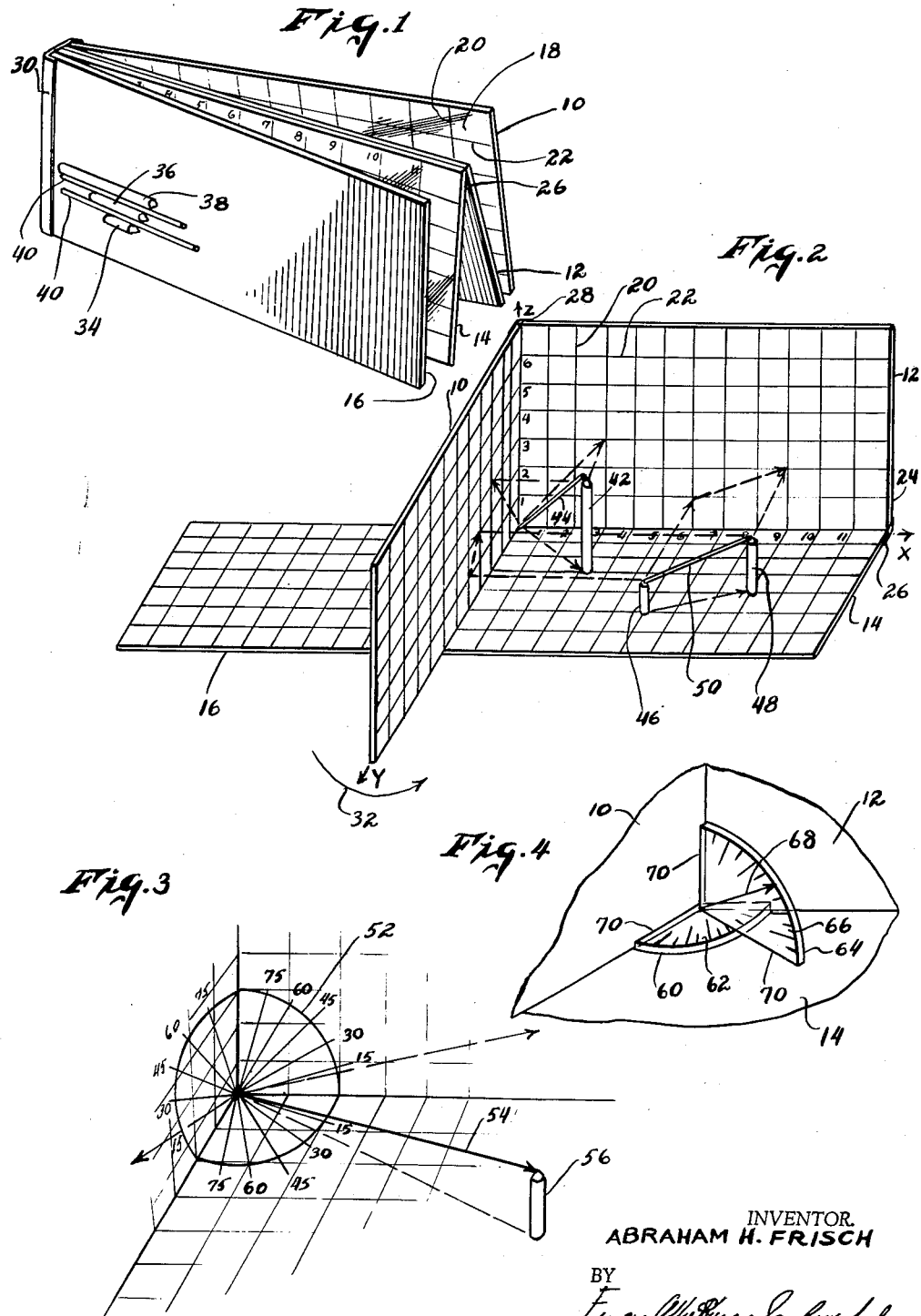
INVENTOR.
ABRAHAM H. FRISCH
BY
ATTORNEYS

United States Patent Office 3,028,686
Patented Apr. 10, 1962

3,028,686
DEVICE FOR ILLUSTRATING VECTORS
Abraham H. Frisch, 320 E. 53rd St., New York, N.Y.
Filed July 6, 1961, Ser. No. 122,234
8 Claims. (Cl. 35—34)

This invention relates to a vector demonstration device which may be folded for convenient carrying and which, when unfolded, may be used to visually demonstrate various vector relationships such as vector projections on coordinate planes and translation from one coordinate system to another.

It has been found that vector relationships may best be understood if visual aids are employed for demonstration. However, most visual aids are too bulky for convenient carrying and are thus restricted in use to formal, preplanned lectures.

It is, therefore, a primary object of this invention to provide a portable, easily utilized device for the visual demonstration of vector relationships.

In accordance with this object, there is provided, in a preferred embodiment of this invention, a demonstration device comprising at least three rectangular, metal plates. One surface of each of the plates is polished to a mirror-like smoothness and a grid is ruled thereon. The plates are hingedly connected so that they may be folded into a flat, easily transported package and unfolded into a self-supporting structure in which the polished surfaces form mutually perpendicular planes.

A plurality of bar magnets of different lengths, each length preferably being an even multiple of the grid spacing, are provided. To visually demonstrate a vector relationship, therefore, such as the projection of a vector along the coordinate planes, the magnetized rod of the desired length is selected and placed on the grid system at the intersection of the appropriate grid lines to establish a point in space defined by the three cordinates.

Light metallic wires are provided of varying lengths to represent the vector in the coordinate system as, for example, a vector extending from the intersection of the three coordinate planes to the point defined by the end of the magnetized rod. The wire is simply placed in position and held by the rod magnet. The student may then view the vector represented by the wire in the mirrored surface of the rectangles defining the coordinate planes. Thus, for example, for projection of the vector, he need merely observe the vector in the mirrored surface and obtain a visual representation of the projections in each of the coordinate planes.

In another embodiment of this invention, a protractor scale may be provided at each corner of the rectangular plates. Thus, the vector may be established in the three coordinate system by use of Polar coordinates, that is, by definition of the length of the vector and the angle of the vector from mutually perpendicular coordinate axes. With such vector established, the translation of the vector into a Cartesian system may be similarly effected merely by viewing the vector in the mirror surface of the individual rectangles.

This invention will be more clearly understood by reference to the following description taken in combination with the accompanying drawings, of which:

FIG. 1 is a perspective view of a preferred embodiment of this invention folded for carrying;

FIG. 2 is a perspective view of the apparatus shown in FIG. 1 set up for the demonstration of vectors in a three coordinate plane; and FIGS. 3 and 4 are diagrammatic views of the apparatus shown in FIG. 2 useful for explanation of the conversion between coordinate systems.

In FIGS. 1 and 2 there is shown the device for illustrating vectors which consists of four rectangular metal plates 10, 12, 14 and 16 respectively. One surface 18 of each plate is polished to mirror-like smoothness and this surface is provided with a grid etched on the surface consisting of parallel vertical lines 20 and parallel horizontal lines 22 which are spaced apart by a predetermined increment. For convenience, each increment may be numbered in multiples as illustrated by numerals 24.

Plates 12 and 14 are hingedly connected along the common long edge. I have found it entirely satisfactory and extremely convenient to provide this hinge connection merely by applying a strip of plastic base, pressure sensitive tape 26 along the mating edges. The plates are preferably held back to back during application of the plastic tape to provide a gap therebetween allowing the plates to be folded and unfolded without overstressing the tape. Similarly, plates 10 and 12 are joined along a common shorter edge by tape 28 and plates 14 and 16 are joined along a common mating shorter edge by tape 30.

The hinge structure may also be a piano-type long hinge which is fitted into the long joint, allowing for the thickness of the plates. In the calibration of planes to lay out coordinates and in mounting the hinges, it is understood that the mechanical requirements are that the intersections of the mutually perpendicular plates be the $x$, $y$ and $z$ axes.

Thus, the entire device may be folded into a compact, thin rectangular package for ease of carrying the device from location to location. However, when it is desired to set up the device for the demonstration of vector relationships, the plates are merely unfolded. To demonstrate vectors in two quadrants, the plates 10 and 12 are lifted together at right angles to the plane defined by plates 14 and 16. If the tape is properly applied, the upstanding plates 10 and 12 will be held in position by the tape tension although a simple support such as a book may be used. For demonstration of one quadrant of three coordinate systems, the plate 10 is rotated about its hinged axis as indicated by arrow 32 to form a three coordinate grid system as illustrated specifically in FIG. 2. This system is, of course, self-supporting. Each plate is made of magnetically soft material, such as iron, for reasons which will become apparent from the following portion of the specification.

A plurality of rod magnets of varying lengths, such as illustrated by rods 34, 36 and 38 which respectively are one, two and three units long (each unit being equal to the distance between grid lines), is provided. The rod magnets are permanent magnets of material such as alnico. Thus although small, the magnetic field is strong enough to hold the rod in the position placed on any of the grids.

Similarly, a plurality of thin wires 40 of varying lengths are provided to represent the vectors. The wires are preferably relatively stiff, magnetically soft material, such as iron wire, which may be positioned on the alnico rods and held in position by the magnetic force.

The wires and the alnico rods are easily carried merely by placing the rods and wires against the outer metal of the folded assembly to which they will adhere by the magnetic attraction. Thus, the package may be easily carried with all the necessary demonstrative equipment appended thereto.

In FIG. 2 there is shown two typical applications of the device.

To visually demonstrate the vector relationships of the vector starting at the intersection of the three plates and extending to a defined point within the three coordinate system, the rod 42 is positioned along the grid 14 at the intersection of the coordinates defining the distance along the $x$ and $y$ axes. The length of the rod 42 is selected to define the distance along the $z$ axis. Thus, the end of the rod defines the end of the vector extending from the intersection of the three coordinate planes. A wire 44 of suitable length may then be positioned with one end at the intersection of the three axes and the other end at the end of the rod to represent the vector. The wire then visually portrays the vector in the three coordinate system. Thus, the student for example may easily visualize projection of the vector upon each of the three coordinate planes. To do this he merely observes the reflection of the wire in each plane in turn. Parallelism is ensured merely by matching the reflected image with the image of the wire.

Thus, not only is there represented the vector in space, but it is easy to obtain a visual representation of the projections of this vector on each plane of the coordinate system which is an important concept to be understood.

Also, it will be noted that two of the three coordinate planes may be used independently. For example, in electrical engineering, one plane will represent the imaginary component of a reactive circuit element and the other plane will represent the real component. In such applications, the rod merely is positioned along one axis of intersecting planes.

The vector need not, of course, start at the intersection of the three axes but may be a vector having a starting point at a predetermined spacial location. Thus, for example, rods 46 and 48 may define the beginning and end of a vector which is represented by the wire 50. The vector representation 50 may be a vector defined by equation or may be the resultant obtained by subtracting vectors to each of the established points in space from the intersection of the three planes. Thus, the visual representation of vectors and the resultant of operations involving vectors may be visually presented. Again, the projection on each of the coordinate planes may be fixed by direct observation.

The coordinate system shown in FIG. 2 utilized Cartesian coordinates. However, Polar coordinates may also be utilized by impressing a compass rose at the corner of each plate as shown in FIG. 3. The vector represented by wire 54 will then be established in Polar coordinates by the length of the vector and the angular deflection of the vector from the two mutually perpendicular axes defining the system. A rod 56 may then be inserted in any convenient location along the vector to hold it in its defined position.

To translate from the Polar to the Cartesian coordinates the student again merely observes the reflection of the wire in the mirrored surface of each plane.

As an alternative to using an imprinted compass rose on each plane, it is often convenient to use the quadrants shown in FIG. 4.

In FIG. 4 there is shown in broken outline the planes 10, 12 and 14 of FIG. 2. A first protractor quadrant 60 having an angular scale 62 imprinted thereon is provided. The quadrant is preferably of transparent plastic so that, when inserted into the intersection of two planes, the grid scale on plane 14 will be visible through the quadrant.

A second quadrant 64 is provided having an angular scale 66 imprinted thereon. The quadrant 64 has a radius corresponding to the vector length defined in the Polar system.

Thus, the vector defined by the Polar coordinate equation may be represented merely by applying the vector 68 to the quadrant 64 as by crayon at the angle established by the equation and by placing the quadrant 64 on quadrant 62 at the defined angle. The quadrants may be held in position by coating the edges 70 with a pressure sensitive adhesive.

The vector may then be observed by the student and the translation into Cartesian coordinates easily observed.

I prefer to provide a plurality of quadrants 64 of different radii to enable selection of lengths to match the vector length to be visually represented.

This invention may be variously modified and embodied within the scope of the subjoined claims.

What is claimed is:

1. A device for illustrating vectors comprising at least three rectangular metallic plates, the first and second of said plates being hingedly connected along a common long edge thereof, said third plate being hingedly connected along a common short edge thereof to said first plate, one surface of each of said plates being polished to mirror smoothness, said device being adapted to be unfolded from a thin rectangular package into a self-supporting structure of mutually perpendicular plates defining the planes of a three coordinate system, a plurality of rod magnets, each of said magnets comprising a permanent magnet adapted to be positioned on said plates and held thereto by magnetic attraction, and a plurality of magnetic wires adapted to be positioned on said rod magnets and to be held thereto by a magnetic attraction.

2. A device in accordance with claim 1 which includes a fourth rectangular metal plate hingedly connected to said second plate along the common short edge thereof.

3. A device in accordance with claim 1 in which a grid of parallel horizontal and parallel vertical lines are etched at predetermined separation distances on said polished surface.

4. A combination in accordance with claim 1 which includes a compass rose etched on each of said polished surfaces.

5. A device in accordance with claim 1 in which said hinged connection comprises a continuous, flexible joint on said plates along the mating edges.

6. A combination in accordance with claim 1 which includes a plurality of quadrants, each of said quadrants having an angular scale marked thereon, said quadrants being of different radii.

7. A combination in accordance with claim 6 in which said quadrants are made of transparent material.

8. A combination in accordance with claim 6 in which said quadrants are edged with pressure sensitive adhesive.

References Cited in the file of this patent

UNITED STATES PATENTS

| | | |
|---|---|---|
| 1,912,380 | McCully | June 6, 1933 |
| 2,582,080 | Stroukoff et al. | Jan. 8, 1952 |
| 2,977,688 | Redey | Apr. 4, 1961 |